(12) United States Patent
Hewett et al.

(10) Patent No.: US 9,305,285 B2
(45) Date of Patent: Apr. 5, 2016

(54) HEADS-UP DISPLAY FOR IMPROVING ON-LINE EFFICIENCY WITH A BROWSER

(71) Applicant: Datasphere Technologies, Inc., Bellevue, WA (US)

(72) Inventors: Delane Robert Hewett, Bellevue, WA (US); Regis Anclades, Redmond, WA (US); Nathan Johnathan Sweet, Seattle, WA (US); Gary Duncan Cowan, Issawuah, WA (US)

(73) Assignee: Datasphere Technologies, Inc., Bellevue, WA (US)

( * ) Notice: Subject to any disclaimer, the term of this patent is extended or adjusted under 35 U.S.C. 154(b) by 5 days.

(21) Appl. No.: 14/070,315

(22) Filed: Nov. 1, 2013

(65) Prior Publication Data
US 2015/0128021 A1    May 7, 2015

(51) Int. Cl.
*G06F 17/00* (2006.01)
*G06Q 10/10* (2012.01)
(Continued)

(52) U.S. Cl.
CPC ............ *G06Q 10/10* (2013.01); *G06F 17/2247* (2013.01); *G06F 17/30* (2013.01); *G06Q 10/06398* (2013.01); *G06F 17/30864* (2013.01); *G06Q 30/0251* (2013.01)

(58) Field of Classification Search
CPC . G06Q 10/06398; G06Q 10/06; G06Q 10/10; G06Q 10/0639; G06Q 30/0251; H04L 67/02; H04L 67/22; G06F 17/30864; G06F 17/30; G06F 17/2247
USPC .......... 715/207, 210, 234, 246, 205; 707/709, 707/758–770, 805, E17.011–E17.013; 709/206, 203, 217–219; 705/7.29, 705/7.11, 7.27, 7.38, 7.42
See application file for complete search history.

(56) References Cited

U.S. PATENT DOCUMENTS 6,523,021 B1 * 2/2003 Monberg .......... G06F 17/30864
6,725,425 B1 * 4/2004 Rajan et al. .................... 715/205
(Continued)

OTHER PUBLICATIONS

Algur, S.P. et al.,"Extraction of Flat and Nested Records from Web Pages," © Dec. 2006 Australian Computer Society, Inc., in Coferences in Research and Practice in Information Technology (CRPIT) vol. 61, pp. 163-168.*
(Continued)

*Primary Examiner* — Cesar Paula
*Assistant Examiner* — James H Blackwell
(74) *Attorney, Agent, or Firm* — John W. Branch; Lowe Graham Jones PLLC

(57) ABSTRACT

Embodiments are directed to a heads-up display for improving efficiency for displaying information using a web browser. Content-of-interest may be determined in web documents based in part on content profiles corresponding to the web documents. The determined content-of-interest may be compared with other information stored separately from the web browser. Business Information associated with the determined content-of-interest may be determined based on the comparison of the other information and the content-of-interest. Plugin information for a plugin document may be generated based on the a portion of the business information and the at least a portion of content-of-interest. The generated plugin document may be displayed in the web browser. The web documents may be modified based on the business information that may correspond to the determined content-of-interest. And, the modified web documents may displayed in the web browser.

26 Claims, 10 Drawing Sheets

(51) Int. Cl.
*G06Q 10/06* (2012.01)
*G06F 17/22* (2006.01)
*G06F 17/30* (2006.01)
*G06Q 30/02* (2012.01)

(56) References Cited

U.S. PATENT DOCUMENTS

| | | | | |
|---|---|---|---|---|
| 6,820,237 | B1* | 11/2004 | Abu-Hakima et al. | 715/210 |
| 6,883,000 | B1* | 4/2005 | Gropper | 1/1 |
| 7,043,531 | B1* | 5/2006 | Seibel et al. | 709/206 |
| 7,275,083 | B1* | 9/2007 | Seibel et al. | 709/206 |
| 7,539,933 | B2* | 5/2009 | Brown et al. | 715/207 |
| 8,027,871 | B2* | 9/2011 | Williams et al. | 705/7.31 |
| RE42,870 | E* | 10/2011 | Seibel et al. | 707/769 |
| 8,086,676 | B2* | 12/2011 | Palahnuk et al. | 709/206 |
| 8,095,882 | B2* | 1/2012 | Kashi | 715/763 |
| 8,145,515 | B2* | 3/2012 | Whitsitt et al. | 705/7.11 |
| 8,543,571 | B2* | 9/2013 | Baessler et al. | 707/726 |
| 2002/0004844 | A1* | 1/2002 | Harari et al. | 709/238 |
| 2002/0087387 | A1* | 7/2002 | Calver et al. | 705/10 |
| 2002/0120498 | A1 | 8/2002 | Gordon et al. | |
| 2003/0061232 | A1* | 3/2003 | Patterson | 707/104.1 |
| 2004/0205500 | A1* | 10/2004 | Brown et al. | 715/501.1 |
| 2005/0060430 | A1 | 3/2005 | Riise et al. | |
| 2005/0131760 | A1* | 6/2005 | Manning et al. | 705/14 |
| 2005/0228704 | A1* | 10/2005 | Fishman et al. | 705/8 |
| 2005/0262435 | A1* | 11/2005 | Ramanujan | 715/513 |
| 2006/0010379 | A1* | 1/2006 | Kashi | 715/531 |
| 2006/0212337 | A1* | 9/2006 | Vayghan et al. | 705/10 |
| 2007/0027757 | A1 | 2/2007 | Collins et al. | |
| 2007/0245238 | A1 | 10/2007 | Fugitt et al. | |
| 2008/0040175 | A1 | 2/2008 | Dellovo | |
| 2008/0059539 | A1* | 3/2008 | Chin et al. | 707/203 |
| 2008/0140722 | A1 | 6/2008 | Jakobovits | |
| 2008/0270164 | A1 | 10/2008 | Kidder et al. | |
| 2009/0012866 | A1 | 1/2009 | Celik et al. | |
| 2009/0037356 | A1* | 2/2009 | Rothstein et al. | 706/46 |
| 2009/0070190 | A1 | 3/2009 | Gorty et al. | |
| 2009/0099934 | A1 | 4/2009 | Lee et al. | |
| 2009/0157717 | A1* | 6/2009 | Palahnuk et al. | 707/101 |
| 2009/0319187 | A1 | 12/2009 | Deeming et al. | |
| 2010/0036719 | A1 | 2/2010 | Eklund | |
| 2010/0131339 | A1* | 5/2010 | Singh | 705/10 |
| 2010/0153544 | A1 | 6/2010 | Krassner et al. | |
| 2010/0174713 | A1* | 7/2010 | Baessler et al. | 707/736 |
| 2010/0228593 | A1 | 9/2010 | Belwadi et al. | |
| 2010/0306389 | A1 | 12/2010 | Mu et al. | |
| 2011/0015992 | A1 | 1/2011 | Liffiton et al. | |
| 2011/0035273 | A1 | 2/2011 | Parikh et al. | |
| 2011/0161161 | A1 | 6/2011 | Juda et al. | |
| 2011/0238487 | A1 | 9/2011 | Chang et al. | |
| 2011/0276392 | A1 | 11/2011 | Vaver et al. | |
| 2011/0282978 | A1* | 11/2011 | Paithankar | 709/221 |
| 2012/0078875 | A1* | 3/2012 | Price | 707/709 |
| 2012/0198056 | A1* | 8/2012 | Shama et al. | 709/224 |
| 2012/0265610 | A1* | 10/2012 | Shama et al. | 705/14.49 |
| 2012/0271709 | A1 | 10/2012 | Ogawa | |
| 2012/0310728 | A1 | 12/2012 | Kagan | |
| 2013/0073416 | A1 | 3/2013 | Rosenoff et al. | |
| 2013/0080910 | A1* | 3/2013 | Bingell | G06F 3/048 715/744 |
| 2013/0096988 | A1 | 4/2013 | Grossman et al. | |
| 2013/0325587 | A1 | 12/2013 | Kothari et al. | |
| 2013/0339114 | A1 | 12/2013 | Plut | |

OTHER PUBLICATIONS

Liu, B. et al., "Mining Web Pages for Data Records," © 2004, IEEE, pp. 49-55.*

Liu, B. et al., "Mining Data Records in Web Pages," © 2000, ACM, pp. 1-10.*

Official Communication received for U.S. Appl. No. 13/917,158, mailed Nov. 4, 2013.

Official Communication for U.S. Appl. No. 14/204,754 mailed Jul. 8, 2014 (24 pages).

Official Communication for U.S. Appl. No. 14/204,754 mailed Dec. 18, 2014 (27 pages).

Official Communication for U.S. Appl. No. 14/204,754 mailed Mar. 4, 2015 (6 pages).

Official Communication for U.S. Appl. No. 14/223,663 mailed Jun. 10, 2014 (15 pages).

Official Communication for U.S. Appl. No. 14/223,663 mailed Nov. 5, 2014 (19 pages).

Official Communication for U.S. Appl. No. 14/223,663 mailed Jan. 14, 2015 (5 pages).

Official Communication for U.S. Appl. No. 14/223,663 mailed May 11, 2015 (19 pages).

Official Communication for U.S. Appl. No. 13/917,158 mailed on Apr. 23, 2014 (38 pages).

Official Communication for U.S. Appl. No. 13/917,158 mailed on Jul. 10, 2014 (3 pages).

Official Communication for U.S. Appl. No. 13/917,158 mailed on Oct. 7, 2014 (35 pages).

* cited by examiner

HEADS-UP DISPLAY FOR IMPROVING ON-LINE EFFICIENCY WITH A BROWSER

TECHNICAL FIELD

The present invention relates generally to visualization and display of information, and more particularly to, automatically augmenting the information displayed in a web browser.

BACKGROUND

The internet provides convenient access to information that may be useful for many business reasons. In many cases, business may direct employees to use web browsers or similar applications to conduct data prospecting by browsing through various sources of information that may be available over the internet. Web sites visited by these employees may include a variety content that may include information useful to the business, such as, contact information (e.g., telephone numbers, email addresses, or the like) for prospective clients. However, the useful information may be mixed in with less valuable information such as advertisements, or the like. Also, in some cases, the business information that may appear to be valuable to one employee may have been previously discovered by other employees. Accordingly, in some cases, business information discovered by prospecting with a web browser may appear to be newly discovered even though it may be known to the prospecting business. And, in some cases, business information uncovered during prospecting may require special handling which may otherwise be unknown to the prospecting employee. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE EMBODIMENTS

Figure 1:
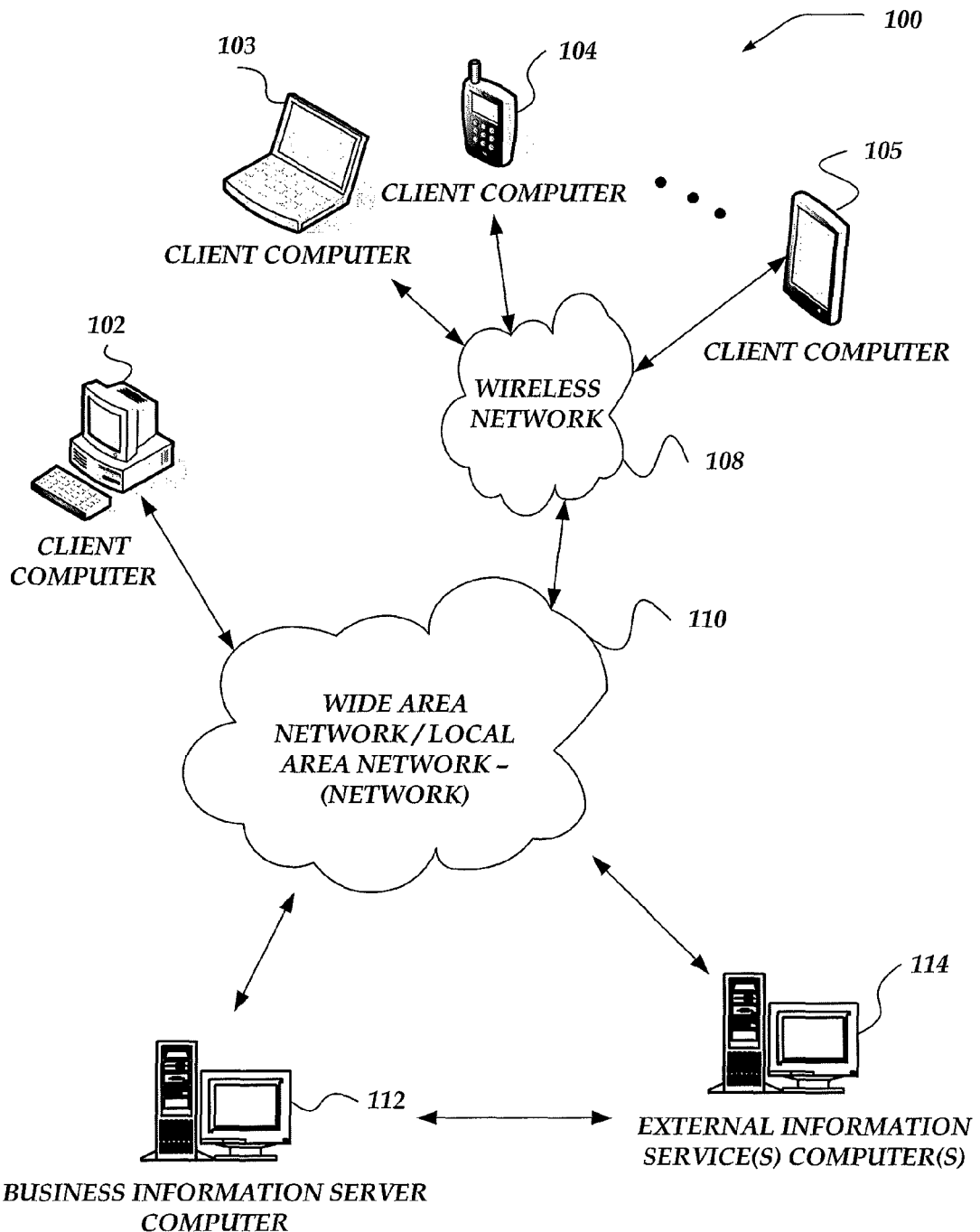
FIG. 1 is a system diagram of an environment in which at least one of the various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term "browser plugin" may refer to an add-on component that provides addition functionality to an existing web browser application. Browser plugins are designed to be integrated with an existing web browser by way of one or more well-known and/or standard interfaces supported by the target web browser. For clarity, browser extensions may be considered to be the same as browser plugins.

As used herein the term "web document" may refer the information included in a web page. In most cases, a particular web document may correspond to a single Uniform Resource Identifier (URI) or Uniform Resource Location (URL). In practice a web document may be an aggregation of information may includes content from multiple sources each having a different URL. However, the web document may be considered the content that is displayed in a web browser if a particular URL is requested. Often web documents are Hypertext Markup Language (HTML) documents provided to web browsers by web servers. However, even though for clarity the claimed subject may be described in terms such as web documents, it should be clear that other types of documents are contemplated, such as, Portable Document Format (PDF) documents, word processing documents, presentation documents, other forms of media in addition to text (e.g., audio, video, images, or the like), groupware documents, or the like.

As used herein the term "plugin profile" may refer to data structure that includes and/or references one or more policy rules that define the type of business information and/or plugin information that may be included in a plugin document. Further, plugin profiles may be arranged to include rules for determined the plugin information that is used for a plugin document. Also, plugin profiles may include user-interface template information that may be employ when a plugin document is formatted for display.

As used herein the term "plugin document" may refer to a document arranged to include information associated with and/or derived from the content-of-interest that may have been determined by a business information application.

As used herein the term "plugin information" may refer to information that may be determined for generating plugin documents. Plugin information may be derived from business information associated with the content-of-interest that may included in a web document.

As used herein the term "content access information" may refer to information the may be determined for generating plugin documents. Content access information may be information related to how the prospecting business and/or its employees have interacted with content-of-interest, web documents, web sources, or the like. For example, content access information may include a list of employees that have accessed the same web documents in the past 24 hours. The particular content access information that may be included in a plugin document may be determined based on a plugin profile.

As used herein the term "plugin engine code" may refers computer instructions that may be employed by a browser plugin for performing one or more actions for heads-up display for improving on-line efficiency with a browser. Plugin engine code may be updated independent of the browser plugin. Thus, updating the plugin engine code may occur separate from updating the browser plugin.

As used herein the term "content-of-interest" may refer to particular portions of content included in a web document that may be of greater interest to a user. Content-of-interest may be determined and/or extracted from a web document for further processing. For example, in a sales prospecting application, content-of-interest may include telephone numbers, street addresses, email addresses, or the like.

As used herein the term "business information" may refer to information that may be derived from, associated with, and/or corresponding to the content-of-interest that may be determined from a web document. Business Information may be determined by searching one or more database for information related to the content-of-interest. For example, if the content-of-interest is a telephone number, the business information may be determined by searching through a contact information database to determine information that may be associated with the telephone number.

As used herein the term "content profile" may refer to data structures arranged include and/or reference pattern matching rules, regular expressions, data extractions rules, or the like, that may be designed to parse and/or process information provided in web documents. In at least one of the various embodiments, content profiles may be associated with particular web document sources, such as, particular web sites, web applications, search engines, or the like. In some cases, one or more content profiles may be associated with more than one source or web site. Likewise, in at least one of the various embodiments, different content profiles may share one or more of the same elements. For example, content profile A and content profile B may include and/or reference the same pattern matching rules for identifying telephone numbers that may be included in web document content. Also, content profiles may be associated with a content type of a web document. For example, if the web document includes a Multi-purpose Internet Mail Extension (MIME) type indicator declaring that the included content is a comma-separated value (CSV) file, a content profile arranged for processing CSV files may be determined for processing the CSV information.

As used herein, the term "entity" may refer to an entity such as, individual person, partnership, organization, corporation, non-profit, governmental organization, municipality, association, club, or the like. Content-of-interest included in web documents may be associated with one or more particular entities.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a heads-up display for improving the display of information over a network using a web browser. In at least one of the various embodiments, one or more portions of content-of-interest may be determined from web documents based in part on content profiles that may correspond to the source of the web documents. In at least one of the various embodiments, business information associated with the content-of-interest may be determined based on at least the other information that may be remotely located in a datastore, such as, a business information server computer. In at least one of the various embodiments, plugin information for a plugin document may be generated based on the determined business information and the content-of-interest. In at least one of the various embodiments, the web documents, as presented in the user's web browser, may be modified by the plugin based on the determined business information and the content-of-interest such that at least a portion of the modified web documents corresponds to the content-of-interest. In at least one of the various embodiments, the modified web documents and the plugin document may be provided for display in a web browser, such that a user may be enabled to perform one o more actions related to the determined business information.

In at least one of the various embodiments, contact information that corresponds to a new entity may be determined based on it being unavailable in the remotely located datastore. And, in at least one of the various embodiments, the web document modifications may include indicators that indicate that the contact information may be for a new entity In at least one of the various embodiments, at least some of the content-of-interest may be communicated to at least one external information service for determination of additional business information that may be associated with the content-of-interest.

In at least one of the various embodiments, determining the business information may include providing at least a portion of the content-of-interest to at least one external information service such that the external information service provides additional other information. Accordingly, the additional other information may be provided to the remotely located datastore (e.g., business information server) for use in determining the business information.

In at least one of the various embodiments, determining the business information may further includes determining feedback information from at least one user, wherein the feedback information is related to at least one of the determined business information or the content of interest. The feedback information may be provided to the remotely located datastore for use as other information in subsequently determining new business information.

In at least one of the various embodiments, the content-of-interest may further include contact information that may include an email address, a telephone number, a street address, a person name, a business name, other details or published information about the business, or the like.

In at least one of the various embodiments, modifying the at least one web document may further include at least one of graying out at least a portion of the web document, adding content to the at least a portion of the web document, changing a color of the at least a portion of the web document, changing at least one style of the at least a portion of the web document, or changing at least one format of the at least a portion of the web document.

In at least one of the various embodiments, the behavior of a user a user may be monitored and actions that may be determined to be unrelated to the determined business information may be prevented or marked, or otherwise indicated as such.

In at least one of the various embodiments, the behavior or actions of the user may be aggregated and sources included in one or more reports that may be provided to managers and/or supervisors.

In at least one of the various embodiments, a browser plugin in the web browser may be arranged for determining at least a portion of the content-of-interest at the web browser.

In at least one of the various embodiments, plugin engine code may be determined for installing in the browser plugin based on the latest version information of the plugin engine code. The determined plugin engine code may be automatically installed into the browser plugin.

In at least one of the various embodiments, contact access information may be determined based on the content-of-interest and the web document, such that the determined contact access information includes at least an identifiers that may correspond to actions performed on the content-of-interest by a another user at another time in the past or as it may be happening in real-time via communication between the plug-in across the network.

In at least one of the various embodiments, determining the business information, may further include, determining historical information that may correspond to one or more portions of content-of-interest.

In at least one of the various embodiments, generating the plugin information for the plugin document further includes determining a number of other browser plugin users that are currently accessing the web document.

Illustrative Operating Environment

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs)-(network) 110, wireless network 108, client computers 102-105, Business Information Server Computer 112, External Information Services Computers 114.

At least one embodiment of client computers 102-105 is described in more detail below in conjunction with FIG. 2. In one embodiment, at least some of client computers 102-105 may operate over a wired and/or wireless network, such as networks 110 and/or 108. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, an accounting server, a production server, an inventory server, or the like. However, client computers 102-105 are not constrained to these services and may also be employed, for example, as an end-user computing node, in other embodiments. It should be recognized that more or less client computers may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable personal computer capable of connecting to another computing device and receiving information such as, laptop computer 103, smart mobile telephone 104, and tablet computers 105, and the like. However, portable computers are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer may employ the browser application to perform various activities over a network (online). However, another application may also be used to perform various online activities.

Client computers 102-105 may also include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Business Information Server Computer 112, Content Management Server Computer 114, or other computers.

Client computers 102-105 may further be configured to include a client application that enables an end-user to log into an end-user account that may be managed by another computer, such as Business Information Server Computer 112, or the like. Such end-user accounts, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers and/or computing devices, including, Business Information Server Computer 112, External Information Services Computer 114, client computer 102, and client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Business Information Server Computer 112 is described in more detail below in conjunction with FIG. 3. Briefly, however, Business Information Server Computer 112 includes virtually any network computer capable of monitoring actions and/or views associated with campaign content. Business Information Server Computer 112 may determine statistics regarding the published content or collect statistics based on the users and web documents. Further, in at least one of the various embodiments, Business Information Server Computer 112 may deliver content, including browser plugins, plugin engine code, audio, video, images, html, news, events, or the like, or combination thereof. Further, Business Information Server Computer may be arranged to collect and analyze action information and/or view information, generate performance information, generate reports, dashboard display information, or the like. Computers that may be arranged to operate as Business Information Server Computer 112 include various network computers, including, but not limited to personal computers, desktop computers, multiprocessor systems, microprocessor-based or programmable consumer electronics, network PCs, server computers, network appliances, and the like.

Although FIG. 1 illustrates Business Information Server Computer 112 as a single computer, the various embodiments are not so limited. For example, one or more functions of the business information Server Computer 112 may be distributed across one or more distinct network computers. Moreover, Business Information Server Computer 112 is not limited to a particular configuration. Thus, in one embodiment, Business Information Server Computer 112 may contain a plurality of network computers. In another embodiment, Business Information Server Computer 112 may contain a plurality of network computers that operate using a master/slave approach, where one of the plurality of network computers of Business Information Server Computer 112 operates to manage and/or otherwise coordinate operations of the other network computers. In other embodiments, the Business Information Server Computer 112 may operate as a plurality of network computers within a cluster architecture, a peer-to-peer architecture, and/or even within a cloud architecture. Thus, the invention is not to be construed as being limited to a single environment, and other configurations, and architectures are also envisaged.

Although illustrated separately, Business Information Server Computer 112 may be employed as a single network computer, separate network computers, a cluster of network computers, or the like. In some embodiments, either Business Information Server Computer 112, or both, may be enabled to deliver content, respond to user interactions with the content, track user interaction with the content, update browser plugins, update plugin engine code, content profiles, plugin profiles, or the like.

Illustrative Client Computer

Figure 2:
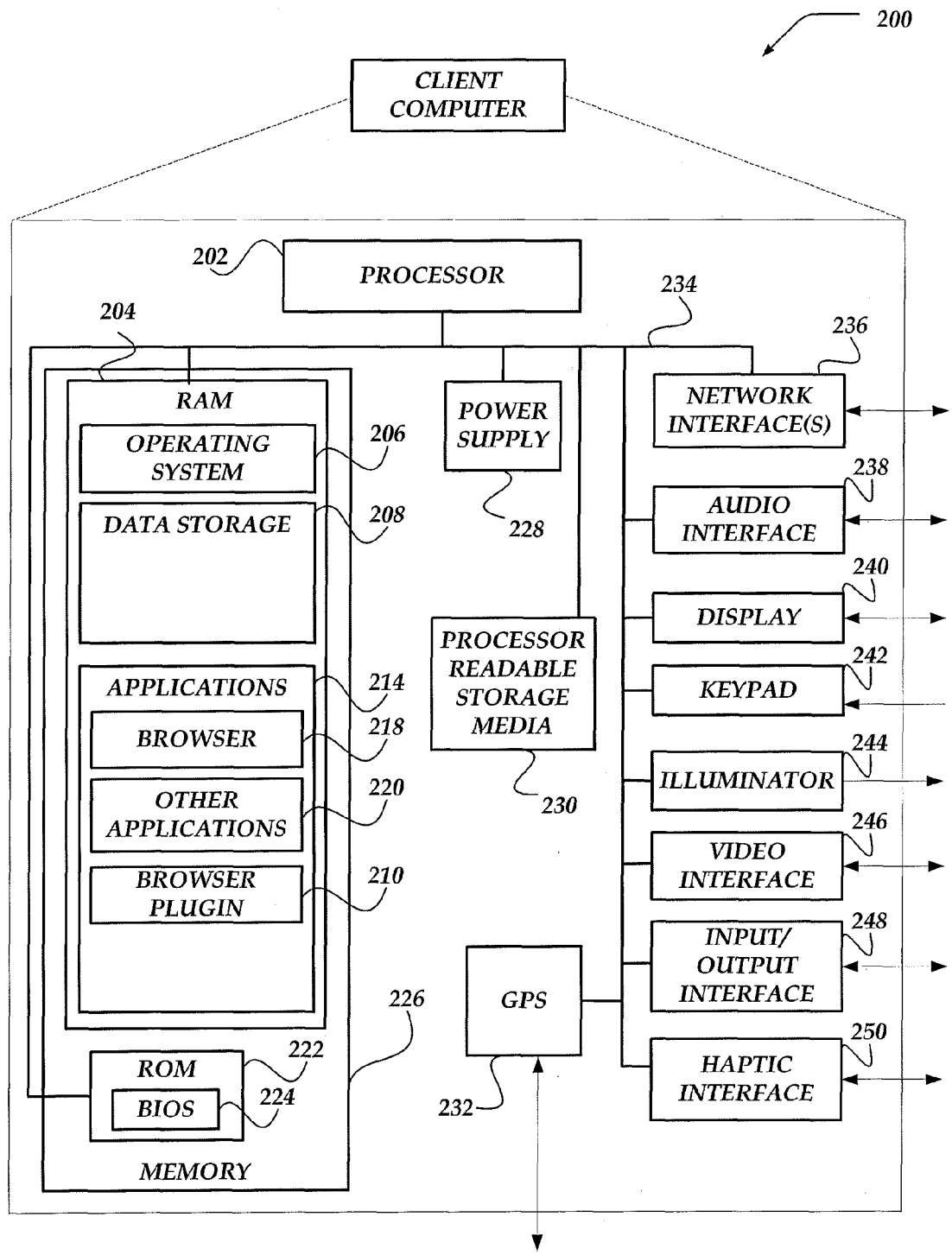
FIG. 2 shows an embodiment of a client computer that may be included in a system such as that shown in FIG. 1.

FIG. 2 shows one embodiment of Client Computer 200 that may be included in a system implementing embodiments of the invention. Client Computer 200 may include many more or less components than those shown in FIG. 2. However, the components shown are sufficient to disclose an illustrative embodiment for practicing the present invention. Client Computer 200 may represent, for example, one embodiment of at least one of Client Computers 102-105 of FIG. 1.

As shown in the figure, Client Computer 200 includes a processor 202 in communication with a mass memory 226 via a bus 234. In some embodiments, processor 202 may include one or more central processing units (CPU). Client Computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to Client Computer 200. A rechargeable or non-rechargeable battery may be used to provide power. The power may also be provided by an external power source, such as an alternating current (AC) adapter or a powered docking cradle that supplements and/or recharges a battery.

Client Computer 200 may optionally communicate with a base station (not shown), or directly with another computer. Network interface 236 includes circuitry for coupling Client Computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the Client Computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computing computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Business Information Server Computer 112 and/or External Information Services Computer 114 of FIG. 1.

Applications 214 may also include Browser Plugin 210. Browser Plugin 210 may be a program that may be provided to the client computer by Business Information Server Computer 112. Browser Plugin 210 may run as native client computer applications or they may run in Browser 218 as web browser based applications and/or plugins. Also, in at least one of the various embodiments, Browser Plugin 210 may be arranged to run as a native application.

Illustrative Network Computer

Figure 3:
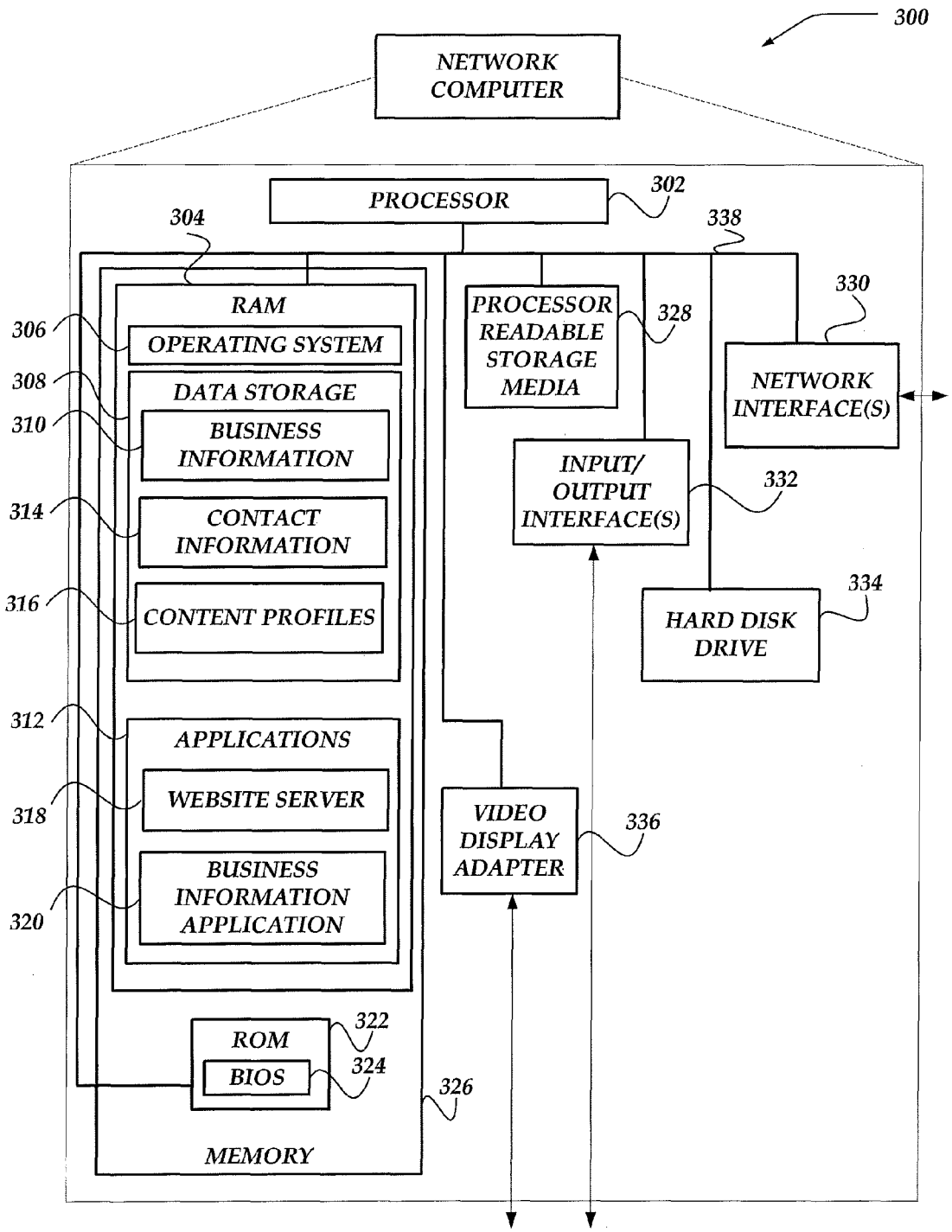
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example Business Information Server Computer 112 of FIG. 1, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data such as content 310. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within client computer 300

Data storage 308 may include a database, text, spreadsheet, folder, file, or the like, that may be configured to maintain and store user account identifiers, user profiles, email addresses, IM addresses, and/or other network addresses; or the like.

In at least one of the various embodiments, Data storage 308 may include business information 310, which may contain information determined for one or more businesses. Also, Data storage 308 may include contact information 314 and content profiles 316. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 312 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include website server 318, Business Information Application 320, or the like.

Website server 318 may represents any of a variety of information and services that are configured to provide content, including messages, over a network to another computer. Thus, website server 318 can include, for example, a web server, a File Transfer Protocol (FTP) server, a database server, a content server, business information server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Business Information Application 320 may be configured to be operative on Business Information Server Computer 112 of FIG. 1. In any event, Business Information Application 320 may employ architectures, processes, or parts of processes, similar to those described in conjunction with FIGS. 4-8, to perform at least some of its actions.

Illustrative Logical System Architecture

Figure 4:
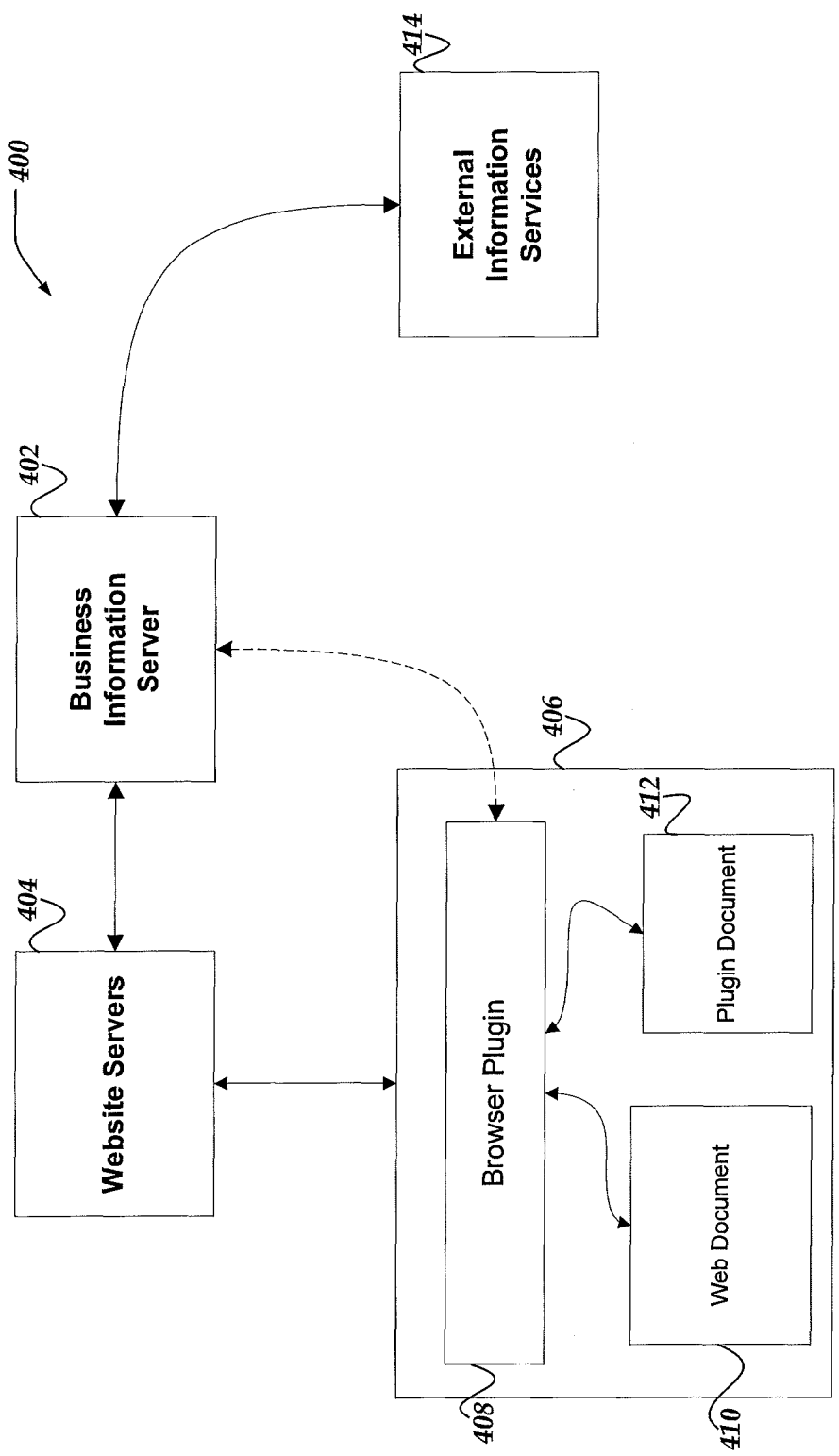
FIG. 4 illustrates a logical architecture of a system for heads-up display for improving on-line efficiency with a browser in accordance with at least one of the various embodiments.

FIG. 4 illustrates a logical architecture of system 400 for heads-up display for improving on-line efficiency with a browser in accordance with at least one of the various embodiments. In at least one of the various embodiments, business information server 402 may be arranged to be in communication with one or more website servers 404. In at least one of the various embodiments, web browser 406 may be operative on a client computer and/or network. One or more users that may be performing business information actions, such as, prospecting for new sales leads, may be using web browser, such as, web browser 406 to browse one or more websites that may include contact information that may be of interest.

In at least one of the various embodiments, a browser plugin component, such as, browser plugin 408, may be arranged to monitor the content of web documents, such as, web document 410. Also, in at least one of the various embodiments, browser plugin 408 may be arranged to generate one or more plugin documents, such as, plugin document 412.

Further, in at least one of the various embodiments, browser plugin 408 may be arranged to communicate with one or more business information servers, such as, business information server 402. In at least one of the various embodiments, browser plugin 408 may be arranged to be in communication with business information server 402 directly over a network. In other embodiments, browser plugin 408 may be in communication with business information server 402 through website servers 404, with website servers 404 providing proxy services between browser plugin 408 and business information server 402. In at one of the various embodiments, business information server 402, websites server 404 may be operative on the same network computers, in other embodiments they may be operative on separate network computers. In at least one of the various embodiments, business information server 402, website servers 404, web browser 408, and browser plugin 408 may be operating on the same computer.

In at least one of the various embodiments, web document 410 may be include content that may be served/provided from websites servers 404. Browser plugin 408 may observe/access the content included in web document 410. If content-of-interest, such as, contact information may be determined to be included in web document 410, browser plugin 408 may perform actions such as communicating with business information server 402 to determine if the content-of-interest should be decorated and/or highlighted if displayed in web document 410. In some cases, business information server 402 may be arranged to determine if content included in web document 410 may be content-of-interest. Thus, in some cases, for some content, browser plugin 408 may be arranged to determine content-of-interest locally, in other cases, browser blugin 408 may be arranged to communicate content information to business information server 402 for determination of content-of-interest. In some cases, a portion of the content-of-interest may be determined by browser plugin 408 while another portion may be determined by business information server 402.

In at least one of the various embodiments, plugin document 412 may be a document generated by browser plugin 408 that may include various information related to the determined content-of-interest. Such information may include additional information that may be associated with the content-of-interest found in web document 410. For example, if web document 410 includes a list of telephone numbers (e.g., a public business directory), plugin document 412 may include information such as, if the telephone number is known to business information server 402, if and/when the telephone number was last called, if the telephone number is reserved for another user, the current relationship between the business associated with this telephone number and the user's company, or the like. Further, plugin document 412 may be arranged to include information regarding the user and the current web document and/or the current website that may have provided the current web document. For example, the plugin document may be arranged to include the date and time the current user last visited the current web documents and/or website. Also, for example, a plugin document, such as, plugin document 412 may be arranged to include the date and time the current user last visited the current website or called a telephone number that is listed on the current web document.

In at least one of the various embodiments, browser plugin 408 may be arranged to employ one or more well-known standard application program interfaces (APIs) for integrating with a web browser. One of ordinary skill in the art will appreciate that various web browser application may include published APIs and/or software development kits (SDKs) for developing and/or integrating with their web browser application. Typically, these SDKs may enable developers to create and deploy applications, such as, plugins, extensions, bookmarklets, add-ons, or the like. In some cases, the functionality of browser plugin 408 may be included directly into a web browser rather than be implemented as a browser plugin, browser extension, bookmarklet, add-on, or the like. For example, at least one of the various embodiments may include a customized web browser arranged to include the functionality of browser plugin 408.

In at least one of the various embodiments, browser plugin 408 may be arranged to monitor one or more actions performed by a user. In particular, browser plugin 408 may be arranged to track if a user interaction with a web document and/or one or more portions of content-of-interest located in the web browser. In at least one of the various embodiments, the monitored actions may be communicated to business information server 402 for archival and/or further processing. In at least one of the various embodiments, the monitored actions may be employed to generate one or more metrics for the user that may be employed to prospect for information. For example, the number of web sites viewed, the number and/or type of actions performed on these web sites by the user, web sources, and the like.

In at least one of the various embodiments, a business information server, such as, business information server 402, may determine content access information such the number of user accessing the same web document and/or the same web source within a given time period. For example, business information server 402 may determine that users be disproportionately prospecting on one web source compared to another. Accordingly, the business information server may generate notifications for the users and/or administrators that they may be saturating one web source at the expense of neglecting other web sources.

Likewise, in at least one of the various embodiments, the action information provided by the browser plugin may be employed to generate one or more metrics for determining the efficiency and/or prospecting success rate of for users. For example, the business information server may monitor how many new and/or otherwise unknown contacts may be discovered because of a user prospecting web browsing. Also, this metric may be combined with a metric that may track the number of new contacts that are converted from prospects to customers. These metrics may be employed to generate scores for the users as well as scores for the web sources.

In at least one of the various embodiments, the browser plugin may be arranged to exclude particular business information from a user based on one or more metrics and/or monitored information. For example, in at least one of the various embodiments, the plugin document may be arranged to include a prioritized call list of telephone numbers. If, in this example, the user is determined to have one or more low performing metrics, such as, the user's percentage of converting prospects into customers is below a defined threshold, the highest quality may be excluded from the telephone number list provided to the poor performing user. In at least one of the various embodiments, quality of telephone (or other business information) may be determined based on various factors, such as, demographics, location, category of the business, being unknown (new) to the business information server, or the like, or combination thereof.

Generalized Operation

The operation of certain aspects of the invention will now be described with respect to FIGS. 5-8. In at least one of various embodiments, processes 500, 600, 700, and 800 described in conjunction with FIGS. 5-8, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. Likewise, in at least one of the various embodiments, processes 500, 600, 700, and 800, or portions thereof, may be operative on one or more client computers, such as client computer 200. However, embodiments are not so limited, and various combinations of network computers, client computers, virtual machines, or the like may be utilized. Further, in at least one of the various embodiments, the processes described in conjunction with FIGS. 5-8 may be operative in system with logical architectures such as those described in conjunction with FIG. 4.

Figure 5:
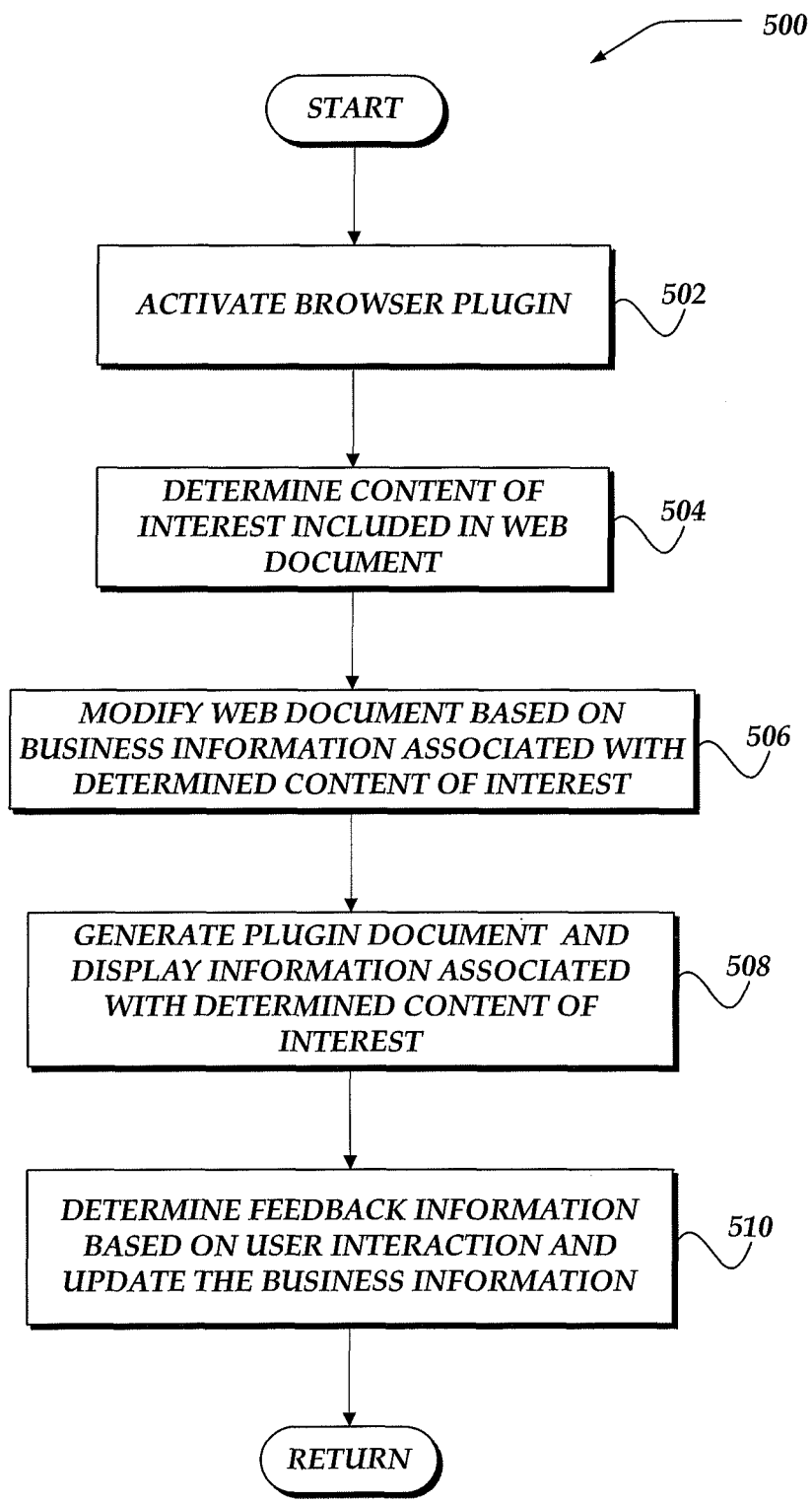
FIG. 5 illustrates an overview flowchart for a process for heads-up display for improving on-line efficiency with a browser in accordance with at least one of the various embodiments.

FIG. 5 illustrates an overview flowchart for process 500 for heads-up display for improving on-line efficiency with a browser in accordance with at least one of the various embodiments. After a start block, at block 502, in at least one of the various embodiments, a browser plugin arranged to provide a heads-up display for improving on-line efficiency may be activated. In at least one of the various embodiments, the browser plugin may be downloaded and/or installed on the client computer if it is absent from the current browsing environment. In at least one of the various embodiments, web browsers provided by various manufacturers may provide one or more standard methods for downloading and/or installing the browser plugin. In at least one of the various embodiments, a user may employ one or more well-known user-interfaces on the web browser application to actively determine and download the browser plugin.

In at least one of the various embodiments, the browser plugin may be an integral and/or preinstalled component of the web browser. In these embodiments the browser plugin may already be available in the web browser.

Also, during this activation block, the browser plugin may be provided one or more updates, including, software updates, policy rules updates, plugin engine code updates, or the like, from a contact manager server. See, FIG. 8 and its accompanying description.

At block 504, in at least one of the various embodiments, the content-of-interest included in the web document may be determined. In at least one of the various embodiments, a browser plugin, such as, browser plugin 408, may be arranged to process some or all of the content included in the web document. Also, in at least one of the various embodiments, some of all of the content included in the web document may be communicated to a business information server for determining which portions of the web documents include content-of-interest. In some cases, a portion of the web document may be processed by the browser plugin and the same or another portion of the web document may be processed by the business information server. Rule based policies may be employed to determine how the web document process may be distributed, For example, the browser plugin may be configured to first process the web document to determined advertising content and then communicate the non-advertising portions of the web document to the business information server.

At block 506, the content included in the web document may be modified based on business information determined to be associated with the determined content-of-interest. In at least one of the various embodiments, the browser plugin may be arranged to modify, decorate, and/or emphasize portions of the web document content that may correspond to the determined content-of-interest. Also, additional information may be added to the web document based on the business information determined based on the content-of-interest.

At block 508, in at least one of the various embodiments, at least one plugin document may be generated and displayed in association with the web document. The plugin documents may include business information associated with the determined content-of-interest. In at least one of the various embodiments, the plugin document may be implemented various ways, including, as popup browser windows, a toolbar/sidebar of the browser, or the like. In at least one of the various embodiments, the plugin document may be added to or appended to the web document using one or more well-known HTML/javascript techniques. For example, a the content that comprises the plugin document may be included in one or more HTML elements, such as, DIVs, IFRAMEs, Ps, or the like, that may be included in the web document using Document Object Model (DOM) manipulation.

At block 510, in at least one of the various embodiments, feedback information may be determined based on user interaction and the business information server may be updated accordingly. For example, in at least one of the various embodiments, the plugin document may be arranged to enable a user to grade the quality of the business information included in the modified web documents and/or the plugin document. In at least one of the various embodiments, the feedback information may be recorded in the business information server for application when determining business information in the future. For example, content-of-interest, such as, telephone numbers, that may be graded as inaccurate may be excluded from business information, marked as inaccurate (e.g, in the web document), or the like. Next, in at least one of the various embodiments, control may be returned to a calling process.

Figure 6:
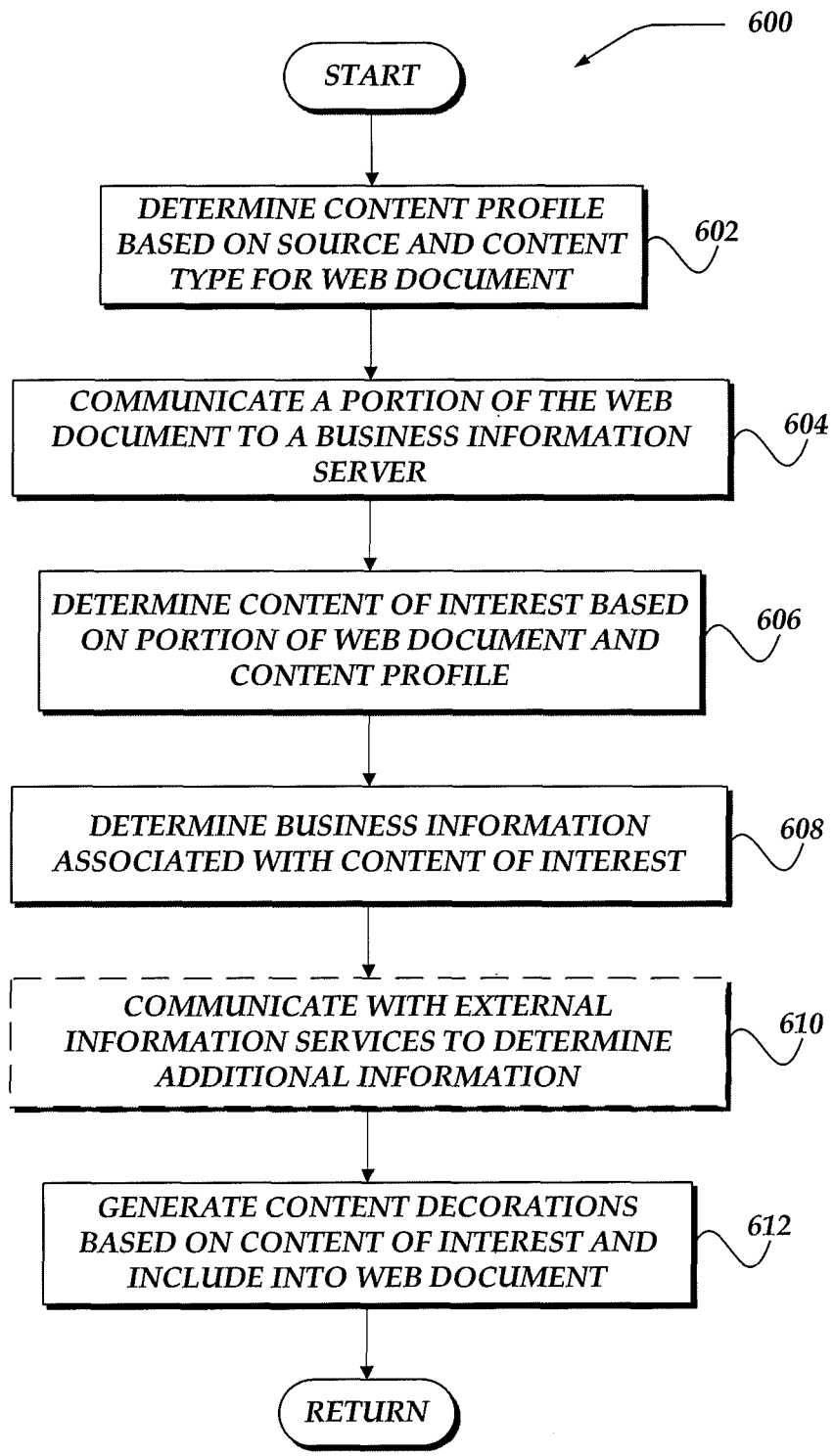
FIG. 6 shows a flowchart for a process for determining contact information and/or business information for web document content in accordance with at least one of the various embodiments.

FIG. 6 shows a flowchart for process 600 for determining contact information and/or business information for web document content in accordance with at least one of the various embodiments. After a start block, at block 602, in at least one of the various embodiments, a content profile may be determined for the web document based on the source of the web document and/or the content test. In at least one of the various embodiments, a content profile may include information that may be employed for parsing and/or processing the content of a web document.

In at least one of the various embodiments, one or more "generic" content profiles may be implements for processing web document content. For example, if a specific/particular content profile is not determined for a information source, a generic content profile may be employed for indentify common types of business information, such as, email addresses, telephone numbers, or the like.

In at least one of the various embodiments, content profiles may be arranged using one or more well-known data structures, such as, arrays, lists, hashes, associative arrays, JavaScript Object Notation (JSON) objects, or the like. In some embodiments, content profiles may be stored in a configuration repository, such as, a database, configuration files, or the like. Also, in at least one of the various embodiments, content profiles may be determined and/or generated on the fly based on one or more built-in policy based rules and/or conditions.

In at least one of the various embodiments, the browser plugin may be arranged to determine some or all of the content profiles. In some embodiments, the browser plugin may be arranged to employ a lookup table provided by the business information server for determining the content profile. In other cases, the browser plugin may be arranged to rely of the business information server to determine the contact profile. Accordingly, in at least one of the various embodiments, the browser plugin may enable the web document to be provided to the business information server for determination of a content profile.

At block 604, in at least one of the various embodiments, at least a portion of the web document may be communicated to the business information server. In at least one of the various embodiments, the browser plugin may be arranged to determine one or more portions of the web document to communicate to the business information server. In some embodiments, the browser plugin may be arranged to filter out portions of the web document, such as, images, advertisements, style sheets, or the like. In other cases, the entire web document may be provided to the business information server. In at least one of the various embodiments, the determined content profile may include one or more policy rules for determining which portions of the web documents may be communicated to the business information server.

At block 606, in at least one of the various embodiments, the content-of-interest may be determined based on the portion of web document and its corresponding content profile. In at least one of the various embodiments, content-of-interest may be portions of the web document that may be associated with business information that may be determined to be of interest to the business.

In at least one of the various embodiments, the business information server may process the web document to determine the content-of-interest included in the web document. In at least one of the various embodiments, content-of-interest may be determined based on the content profile corresponding to the web document. If a corresponding content profile has not been determined, the business information server may determine a content profile at this time.

In at least one of the various embodiments, the business information server may employ a business information application, such as business information application 320, to determine the portions of the web document that may correspond to content-of-interest. For example, the business information application may be arranged to determine and/or identify telephone numbers, email addresses, street addresses, business names, persons, or the like, or combination thereof, that may be included in web documents.

In at least one of the various embodiments, the content profile corresponding to a web document may include one or more rules that may be employed to determine the content-of-interest. Such rules may be arranged to exploit one or more known characteristics of the web document.

In at least one of the various embodiments, web document may be comprised of XML, XHTML, HTML, or the like, the include data structure and/or data definition information embedded within the markup language of the document. In at least one of the various embodiments, the content profile corresponding to such web documents may be arranged to exploit the web document's embedded structural information. Accordingly, in at least one of the various embodiments, one or more well-know document processing techniques may be employed to determine, identify, and/or extract contentof-interest from a web document. Such document processing techniques may include regular expressions, DOM manipulation, or the like.

For example, in at least one of the various embodiments, web documents may include the sought after content-of-interest within named elements of the web document. Accordingly, in at least one of the various embodiments, the content profile may be arranged to include and/or reference one or more pattern matching and/or data extraction rules based on the name of page element.

Continuing with this example, in at least one of the various embodiments, if a business directory website is known to enclose business contact information for individual businesses in a named HTML DIV (e.g., <div name="business-1"> . . . </div>) the corresponding content profile for the website may include a pattern matching rule for extracting the business contact information from the named DIVs.

In at least one of the various embodiments, content-of-interest may be included in one or more images, rather than just in text. Accordingly, the business information application may be arranged to process images using machine vision techniques, such as, character recognition, to identify and/or determine business information.

In at least one of the various embodiments, if content-of-interest may be determined from the web document, the business information application may perform actions to determine business information that may be associated with the content-of-interest.

At block 608, in at least one of the various embodiments, the business information application may be arranged to determine business information that may be associated with some or all of the determined content-of-interest from a business information datastore. In at least one of the various embodiments, business information may include information associated that may correspond to the content-of-interest, such as, other contact information, call histories, priority ratings, sales histories, credit worthiness, account balances, product or business reviews, or the like, or combination thereof.

In at least one of the various embodiments, structured sources of information (e.g., databases) may be queried using the content-of-interest that may be extracted/determined from the generally unstructured information included in web documents. As result of the queries, information associated the content-of-interest may be discovered and included in business information that may be provided for display in a modified web document and/or the plugin document.

For example, in at least one of the various embodiments, for content-of-interest such as telephone numbers, the business information application may determine if the telephone number may be previously known to the business information application. In some embodiments, the business information application may include, or have access to a database of known customer telephone numbers. The telephone number determined from the web document may be compared to telephone numbers in the database. Such a comparison may determine that the telephone number may be already known and that there may be additional information stored in the business information databases that may be useful to a user prospecting for information.

For example, in at least one of the various embodiments, the business information application may be arranged to determine additional business information such as, when/if a business has been contacted, which employee last contacted the business, notes or logs associated with previous contacts, which sales region the business may be located, which sales team/team member may be assigned to the business, or the like. Also, if a telephone number, or other content-of-interest, is unknown to the business information application (e.g., the databases have no record of the content) it may indicate that the content-of-interest (e.g., the telephone number) may be associated to a new business or entity.

In at least one of the various embodiments, the business information application may be arranged to determine additional business information that may be associated with one or more businesses that may be associated with a portion of content-of-interest. Also, in at least one of the various embodiments, the business information application may determine internal sales/marketing information that may be associated with content-of-interest.

For example, the content-of-interest may include telephone numbers determined to be associated with a business. Accordingly, in at least one of the various embodiments, additional business information about the businesses associated with each telephone number may be determined. Also, additional sales/marketing operations information that may be associated with each business may also be determined.

In at least one of the various embodiments, the browser plugin may be configured for use by a sales associate to prospect for telephone number of businesses within a particular geographic region. For example, in at least one of the various embodiments, the browser plugin may be arranged to include a user-interface enabling the target geographic region to be established. In other embodiments, a target geographic region for prospecting may be determined based on a configuration setting.

Accordingly, in at least one of the various embodiments, the telephone numbers found in the web documents may be checked to confirm that they have area codes that correspond to the target region. If there are discrepancies, an indication that the telephone number may be an out of region number may be added to the business information corresponding to telephone number. Likewise, if the number of apparent out of target region telephone numbers exceeds a threshold the business information application may generate a warning and/or notification for display in the plugin document.

At block 610, in at least one of the various embodiments, optionally, additional information that may be associated with the content-of-interest may be determined by communicating with one or more external information services.

In at least one of the various embodiments, the business information application may be arranged to communicate with one or more external information services to determine addition information about the businesses that may be associated with the content-of-interest. For example, if the content-of-interest includes telephone numbers, the business information application may submit the telephone numbers to an external telephone directory to confirm that the telephone number may still be operative.

In at least one of the various embodiments, communication with external information services may be accomplished by employing one or more well-known published and/or standardized API's that may be provided by the external information services. Also, in at least one of the various embodiments, customized modules may be arranged to enable communication with external information services.

In at least one of the various embodiments, one or more datastores, such as those associated with business information server, may be updated based on the additional information that may be provided by an external information service. For example, in at least one of the various embodiments, the contact information for an entity that may be stored in the business information server may be updated and/or augmented based on the information provided by the external information services.

At block 612, in at least one of the various embodiments, content modifications and/or decorations may be generated based on the content-of-interest and the determined business information for including into the web document. In at least one of the various embodiments, one or more portions of the web document may be modified to display information on the web document that may be based on the business information determined about the content-of-interest. For example, if content-of-interest, such as a telephone number is determined to be on a do-not-call list, the telephone number in the web document may be struck out to indicate to the user that the telephone number should not be called. Other modifications to the web document may include inserting icons, images, or tooltips to indicate various conditions, for example, distinctive icon images may be included in the web document to indicate that the telephone may be new, confirmed, high priority, or the like. Likewise, in at least one of the various embodiments, font colors and formatting in the web document may be modified as well to convey information to a user. In at least one of the various embodiments, modifying the web document may include graying out at least a portion of the web document, adding content to at least a portion of the web document, changing a color of at least a portion of the web document, changing at least one style of at least a portion of the web document, changing at least one format of at least a portion of the web document, or the like, or combination thereof.

In at least one of the various embodiments, the browser plugin may modify the web document by adding content and/or page elements to the web document. The browser plugin may be arranged to employ one or more well-known techniques for modifying the content of the web document, including javascript, DOM manipulations, Cascading Style Sheet (CSS) style modifications, or the like. Next, in at least one of the various embodiments, control may be returned to a calling process.

Figure 7:
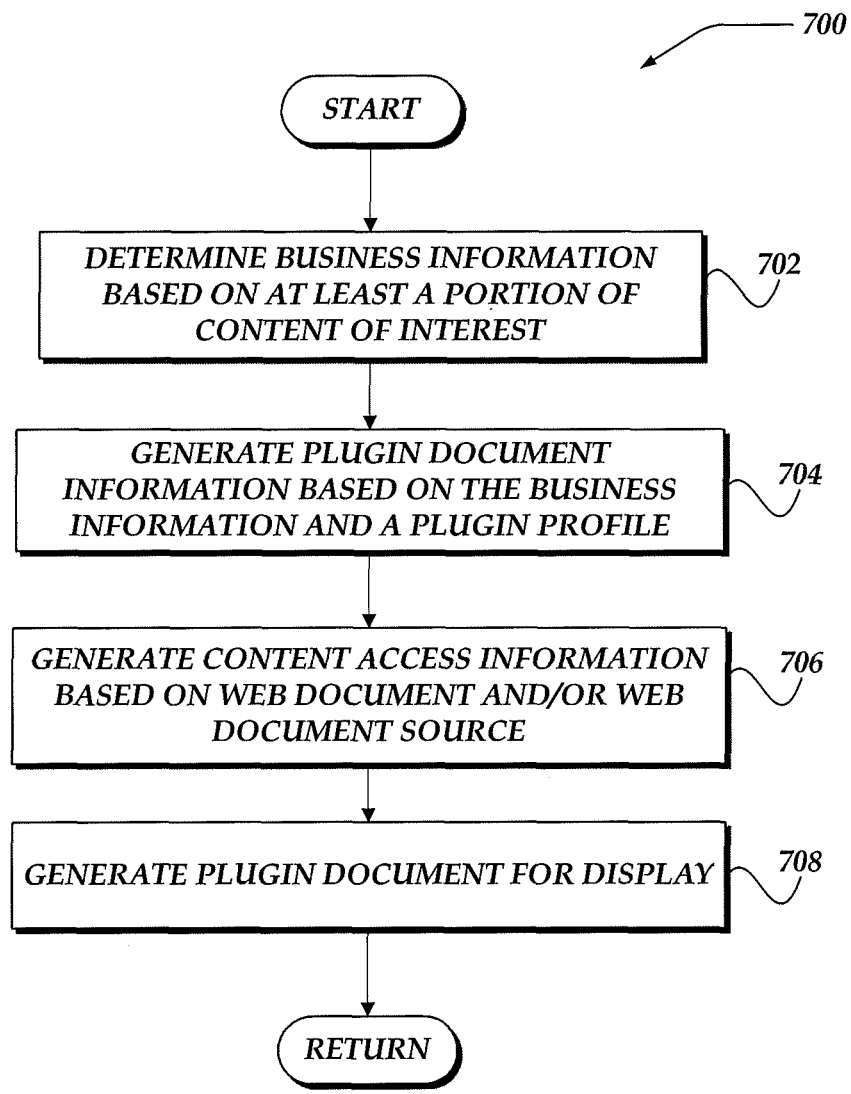
FIG. 7 shows a flowchart for a process for generating one or more plugin documents in accordance with at least one of the various embodiments.

FIG. 7 shows a flowchart for process 700 for generating one or more plugin documents in accordance with at least one of the various embodiments. After a start block, at block 702, in at least one of the various embodiments, as discussed above, business information may be determined based on at least a portion of the content-of-interest determined from the web document. In at least one of the various embodiments, the plugin document may be arranged to include information associated with and/or derived from the content-of-interest that may have been determined by the business information application.

At block 704, in at least one of the various embodiments, plugin information for the plugin document may be generated based on the determined business information and a plugin profile. In at least one of the various embodiments, the business information application may generate plugin information related to the content-of-interest and business information for use in the plugin documents.

In at least one of the various embodiments, the plugin information may be organized into one or more data structures, arranged in part according to a plugin profile. In at least one of the various embodiments, a plugin profile may include policy based rules for determine which business information may be included in the plugin information for a plugin documents. Also, in at least one of the various embodiments, a plugin profile may include policy rules for determining sort order, filtering, allowable actions, or the like, of the plugin information.

In at least one of the various embodiments, a plugin profile may be associated with each user and/or class of user for determining which information may be included in the plugin information and/or how the plugin document may be formatted. In at least one of the various embodiments, a user may be enabled to set preferences for controlling some or all of the characteristics of the plugin information and/or the plugin document.

In at least one of the various embodiments, the plugin profile may include one or more system-wide and/or default settings that may be configured by a user with administrative rights. For example, the plugin profile may be configured to ensure that plugin documents for sales representative users may be limited to include plugin information associated with businesses that are physically located in a particular region.

For example, in at least one of the various embodiments, a list of telephone numbers corresponding to the telephone numbers determined in the web document content may be generated. Further, continuing with this example, additional meta-data that may be associated with the telephone numbers may be associated with the telephone numbers in the list. Likewise, if the plugin profile in this example excludes of one or more telephone numbers, those numbers may be excluded from the plugin information.

At block 706, in at least one of the various embodiments, content access information may be generated based on the web document and/or the web document source. In at least one of the various embodiments, content access information includes information related to how users, such as, sales associates using the browser plugin while browsing for sales leads.

In at least one of the various embodiments, content access information may be information stored and/or accessible by the business information application that may be related to the user history associated with accessing a particular web document and/or web source. In at least one of the various embodiments, this information may include the identity of the last user to access the web document; the number of users currently accessing the same web document and/or web source; or the like.

At block 708, in at least one of the various embodiments, the plugin document may be generated for display. In at least one of the various embodiments, the business information application may generate the document content for the plugin document. The generated plugin document content may include HTML or other similar markup language, suitable for display in a web browser. One of ordinary skill in the art will appreciate that a dynamic user-interface suitable for plugin documents may be generated using methods other than HTML, such as, Java, JavaScript, CSS, or the like, or a combination thereof.

In at least one of the various embodiments, the content management application may provide plugin information and/or content access information to one or more web servers, such as, web servers 404, which may employ the business information to generate the plugin document using one or more well-known web application platforms, such as, Application Server Pages (ASP), Java Server Pages (JSP), Hypertext Processor (PHP), or the like.

In at least one of the various embodiments, the browser plugin may be arranged to fill one or more HTML page elements (e.g., IFRAME, DIV, P, or the like) with the provided plugin document content.

In at least one of the various embodiments, the plugin document content may be arranged to enable a user to perform actions in addition to actions made available in the original web documents and/or the modified web document.

In at least one of the various embodiments, the additional actions may correspond to the content-of-interest and/or they may be related to the business information that may be determined to be associated with the content-of-interest. For example, if the plugin document includes a list of telephone numbers corresponding to contact information in the web document, the plugin document may be arranged to enable the user to initiate telephone calls from the plugin document.

Likewise, in at least one of the various embodiments, plugin documents may be arranged to enable users to enter annotation using user-interface forms presented in the plugin document such that the annotations may be associated with the business information associated with the content-of-interest for future use. For example, in at least one of the various embodiments, the plugin document that includes telephone numbers may be arranged to display a text box that enables a user to enter notes associated with each telephone contact. Next, control may be returned to a calling process.

Figure 8:
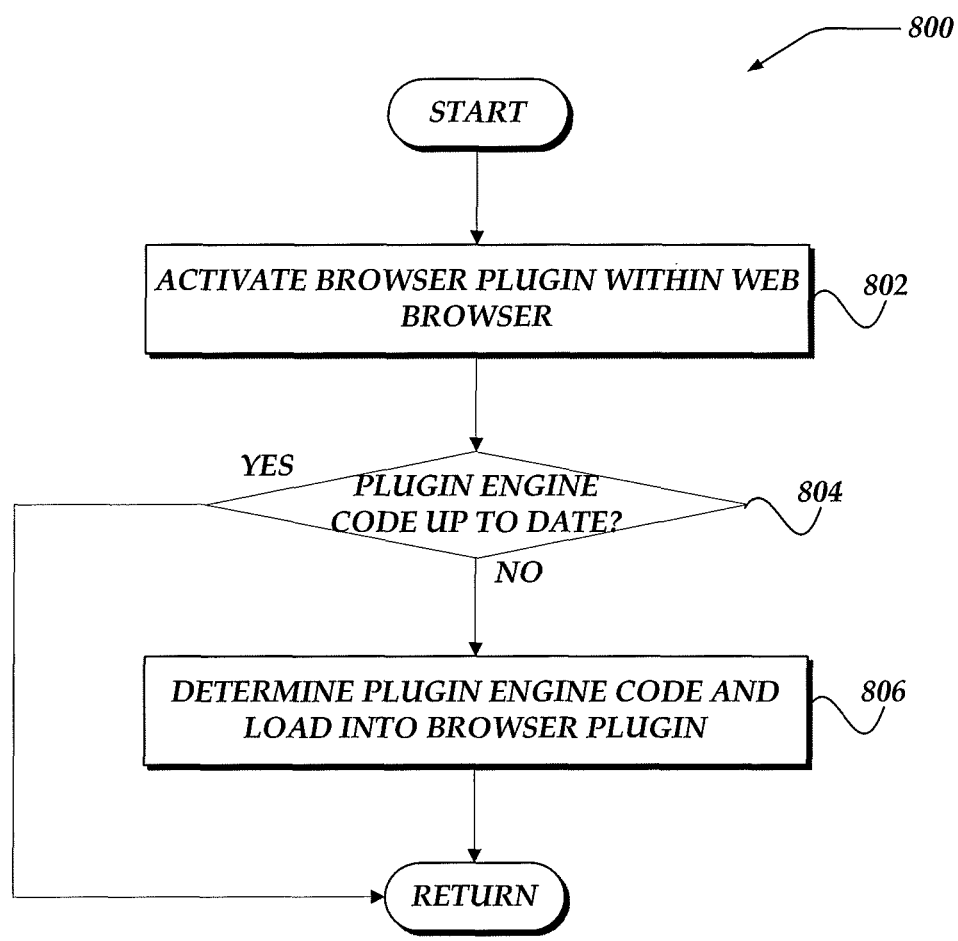
FIG. 8 shows a flowchart for a process for updating plugin code in accordance with at least one of the various embodiments.

FIG. 8 shows a flowchart for process 800 for updating plugin engine code in accordance with at least one of the various embodiments. After a start block, at block 802, in at least one of the various embodiments, the browser plugin may be activated within the web browser. (See, block 502 in FIG. 5).

At decision block 804, in at least one of the various embodiments, if the plugin engine code is determined to be up to date, control may flow to the return block where control may be returned to a calling process; otherwise, control may flow to block 806.

In at least one of the various embodiments, plugin engine code may comprise computer instructions employed internally by the browser plugin. Accordingly, the plugin engine code may be updated separately from the browser plugin itself. In at least one of the various embodiments, enabling the browser plugin to update the plugin engine code separately enables the browser plugin to be updated without user intervention. In at least one of the various embodiments, plugin engine code may comprising one or more well-known and/or custom programming languages, such as, JavaScript, Java, Perl, or the like, or combination thereof.

In at least one of the various embodiments, the browser plugin may be arranged to communicate with a business information server to determine if the plugin engine code currently operative on the browser plugin the correct version. In at least one of the various embodiments, a content delivery server that may be separate from the business information server may be communicated with for determining if the plugin engine code needs to be updated.

At block 806, in at least one of the various embodiments, the appropriate plugin engine code may be determined and deployed in browser plugin. In at least one of the various embodiments, the browser plugin may download the plugin engine code from the business information server. Or, in at least one of the various embodiments, the browser plugin may download the plugin engine code by way of a web server that may be acting as a proxy for the business information server and/or a content delivery server. Next, control may be returned to a calling process.

Illustrative User Interface Use Cases

Figure 9A:
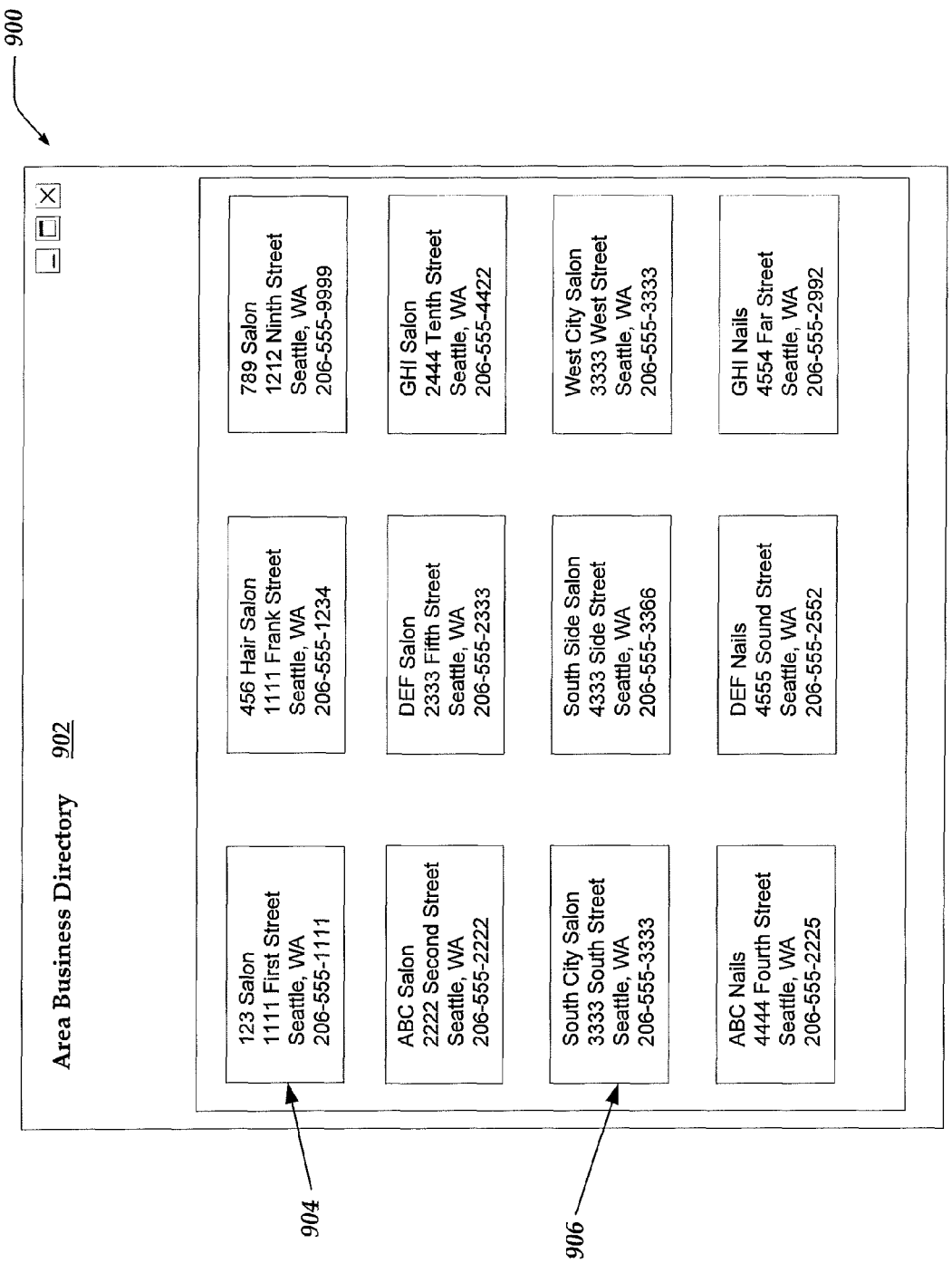
FIGS. 9A and 9B illustrate graphical user interfaces for heads-up display for improving on-line efficiency with a browser in accordance with at least one of the various embodiments.
Figure 9B:
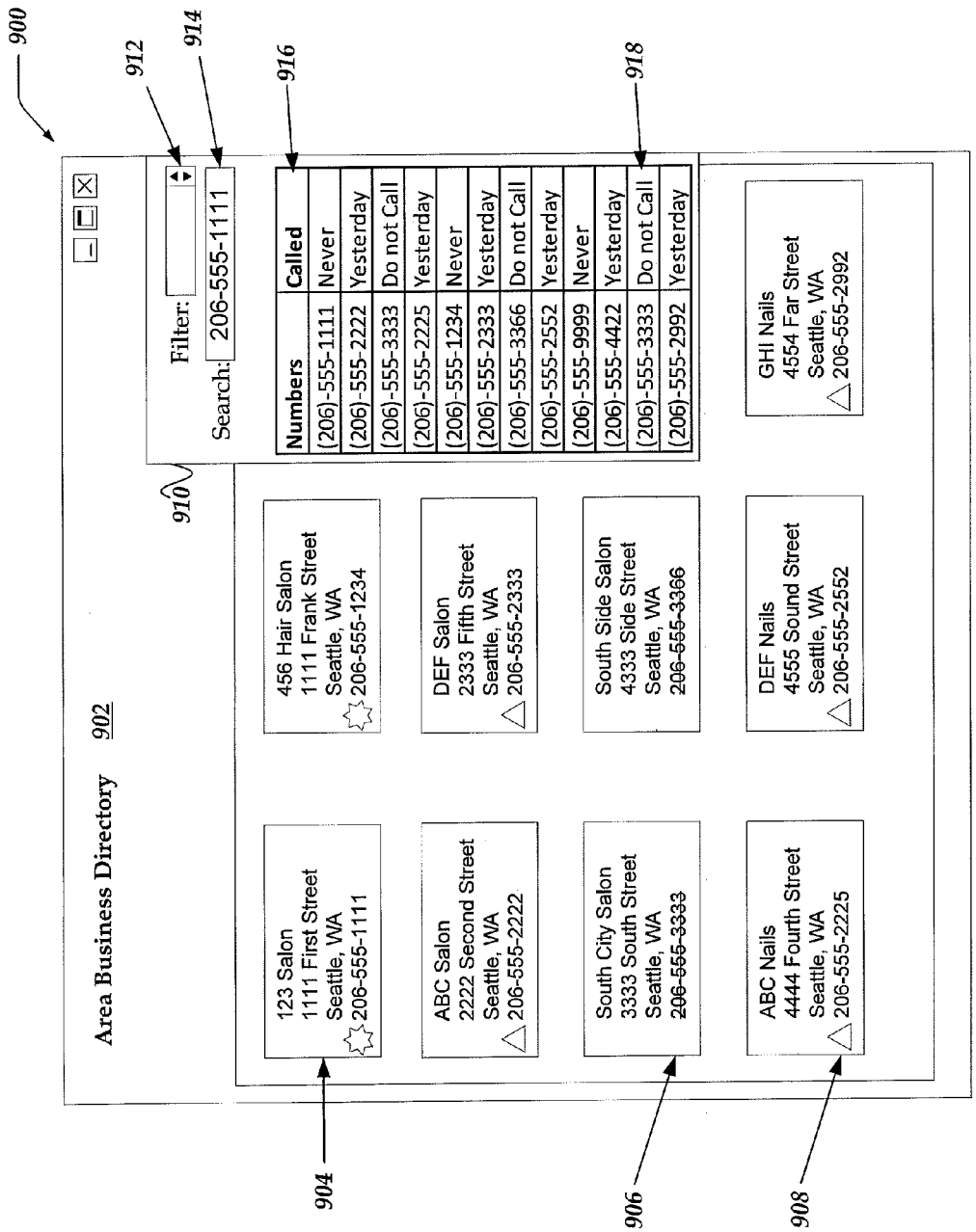

FIGS. 9A and 9B illustrate graphical user interfaces for heads-up display for improving on-line efficiency with a browser in accordance with at least one of the various embodiments. In at least one of the various embodiments, user interfaces other than user interface 900 may be employed without departing from the spirit and/or scope of the claimed subject matter. Such user interfaces may have more or fewer user interface elements which may be arranged in various ways. In some embodiments, user interfaces may be generated using web pages, mobile applications, or the like. In at least one of the various embodiments, business information application 320 may include processes and/or API's for generating user interfaces, such as, user interface 900.

FIG. 9A illustrates user interface 900 as an example of a web browser interface in accordance with at least one of the various embodiments. In at least one of the various embodiments, FIG. 9A represents an example of a web document being accessed in a web browser absent an activated browser plugin. In this example, web document 902 may be a public business information directory that includes a list of information associated with local businesses. In at least one of the various embodiments, various page elements included in web document 902 may include information about the particular businesses. For example, page element 904 includes information corresponding to the business "123 Salon". In this example, page element 904 includes street address information and a telephone number. Clearly, other web documents may include more or less business information than is depicted in this non-limiting example. Likewise, in this example, page element 906 includes business information for another business named "South City Salon."

FIG. 9B illustrates user interface 900 as an example of a web browser interface with an activated browser plugin in accordance with at least one of the various embodiments. In this example, a browser plugin, such as browser plugin 408 is activated and operative for web document 902. In this example, page element 904 is modified to include a decoration that may indicate that the telephone number included in page element 904 may be previously unknown to a business information server, such as, business information server 402. Also, in this non-limiting example, page element 906 is modified and/or decorated by including "strike-through" formatting of the telephone number included in the page element. Further, in this example, page element 908 is modified and/or decorated to include the triangle marker adjacent to the telephone number which indicate that the telephone may be associated with a high priority customer.

In at least one of the various embodiments, plugin document 910 in this example may be generated as an overlay window that may be displayed over and/or adjacent to web document 902. In this example, plugin document 910 may include various user interface elements, such as, one or more filters, represented here by filter 914, one or more search criteria interfaces, represented here by text field 914, or the like.

In at least one of the various embodiments, as discussed above, a plugin document may include information augmenting, summarizing and/or expanding upon the content-of-interest that may be determined in a web document. In this example, plugin document 910 includes table 916 which lists at least a portion of the telephone numbers that were determined in web document 902. In this example, table 916 includes the telephone number and some calling status/action information. Some of the information included in plugin documents may correspond to the modification and/or decoration made to page elements included in the web documents. In this example, in table 916, record 918 indicates that telephone number "(206)-555-3333" has a status of "Do not Call" that corresponds to the "strike-through" formatting included in page element 906.

One of ordinary skill in the art will appreciate that FIGS. 9A and 9B represent a non-limiting example that is in accordance with at least one of the various embodiments. Clearly, it is contemplated that the claimed subject matter is applicable to other web browsers, web documents, having various arrangement and/or configurations. Likewise, it is clear that plugin documents are not limited to the single example presented by plugin document 910. Other embodiments may include plugin documents having more or less user interface elements and/or including different and/or more or less information than is depicted in plugin document 910.

What is claimed as new and desired to be protected by Letters Patent of the United States is:

1. A method for displaying information in a browser over a network, wherein one network device performs actions, comprising:
   determining content-of-interest that is included in one or more web documents based in part on a content profile, wherein the content profile corresponds to a source of the one or more web documents and the content-of-interest includes at least contact information for an entity, and wherein the one or more web documents is viewed by one or more users employing a plug-in for the browser;
   determining business information associated with the content-of-interest based on other information remotely located in a datastore, wherein the business information includes new contact information for customers and non-customers of a business;
   determining a performance value for the one or more users based the at least one user's percentage of converting non-customers into customers of the business;
   when the performance value for the one or more users exceeds a defined threshold, generating plugin information that is included in a plugin document based on the determined business information and the content-of-interest, wherein the plugin document is provided to the one or more users employing the plug-in for the browser;
   when the performance value for the one or more users is less than the defined threshold, excluding a highest quality portion of the business information from the plugin document that is provided to the one or more users;
   modifying the one or more web documents based on the determined business information and the content-of-interest, wherein at one or more portions of the one or more modified web documents corresponds to the content-of-interest, and wherein the modifying includes one or more of graying out the one or more portions of the one or more web documents, adding content to the one or more portions of the one or more web documents, changing one or more colors of the one or more portions of the one or more web documents, changing one or more styles of the one or more portions of the one or more web documents, or changing one or more formats of the one or more portions of the one or more web documents;
   providing the one or more modified web documents and the plugin document for display in the browser, wherein the one user is enabled to perform one action related to the determined business information; and
   when a plurality of users access a same modified web document within a given period of time, providing one or more notifications to the plurality of users advising that the same modified web document is over prospected by the plurality of users and one or more other modified web documents are under prospected based on a determined number of the plurality of users accessing the same modified web document.

2. The method of claim 1, further comprising:
   determining new contact information for a new entity in the one or more web documents that is unavailable in the remotely located datastore; and
   modifying the one or more web documents to indicate the new contact information for the new entity.

3. The method of claim 1, wherein determining the business information further comprises:
   providing a portion of the content-of-interest to one or more external information services, wherein the one or more external information services provides additional other information; and
   providing the additional other information to the remotely located datastore for use in determining the business information.

4. The method of claim 1, wherein determining the business information further comprises:
   determining feedback information from the one or more users, wherein the feedback information is related to one or more of the determined business information or the content of interest; and
   providing the feedback information to the remotely located datastore for use as other information in subsequently determining new business information.

5. The method of claim 1, further comprising:
   configuring the browser plugin for use in a particular geographic region;
   providing a warning in the plugin document when a portion of the contact information for the entity is determined to be outside the particular geographic region and an amount of the outside portion of the contact information is greater than a threshold; and
   modifying the one or more web documents by adding contact information for the entity that is inside the particular geographic region.

6. The method of claim 1, wherein the one or more users is enabled to employ the browser to perform one or more actions, further comprising:
   monitoring one or more behaviors of the one or more users with the plug-in; and
   blocking each performed action that is determined to be unrelated to the determined business information or notifying the one or more users of each performed action that is determined to be unrelated to the determined business information.

7. The method of claim 1, further comprising, determining contact access information based on the content-of-interest and the one or more web documents, wherein the determined contact access information includes an identifier corresponding to one or more other actions that were performed on the content-of-interest by another user.

8. A system for displaying information in a browser over a network, comprising:
   a network computer, including:
      a transceiver for communicating over the network;
      a memory for storing instructions;
      one or more processor devices that is operative to execute instructions that enable actions, including:
         determining content-of-interest that is included in one or more web documents based in part on a content profile, wherein the content profile corresponds to a source of the one or more web documents and the content-of-interest includes contact information for an entity, and wherein the one or more web documents is viewed by one or more users employing a plug-in for the browser;
         determining business information associated with the content-of-interest based on other information remotely located in a datastore, wherein the business information includes new contact information for customers and non-customers of a business;

determining a performance value for the one or more users based the one user's percentage of converting non-customers into customers of the business;

when the performance value for the one or more users exceeds a defined threshold, generating plugin information that is included in a plugin document based on the determined business information and the content-of-interest, wherein the plugin document is provided to the one or more users employing the plug-in for the browser;

when the performance value for the one or more users is less than the defined threshold, excluding a highest quality portion of the business information from the plugin document that is provided to the one or more users;

modifying the one or more web documents based on the determined business information and the content-of interest, wherein at one or more portions of the one or more modified web documents corresponds to the content-of-interest, and wherein the modifying includes one or more of graying out the one or more portions of the one or more web documents, adding content to the one or more portions of the one or more web documents, changing one or more colors of the one or more portions of the one or more web documents, changing one or more styles of the one or more portions of the one or more web documents, or changing one or more formats of the one or more portions of the one or more web documents;

providing the one or more modified web documents and the plugin document for display in the browser, wherein the one user is enabled to perform one action related to the determined business information; and when a plurality of users access a same modified web document within a given period of time, providing one or more notifications to the plurality of users advising that the same modified web document is over prospected by the plurality of users and one or more other modified web documents are under prospected based on a determined number of the plurality of users accessing the same modified web document; and a client computer, including:

a transceiver for communicating over the network;
a memory for storing instructions;
one or more processor devices that is operative to execute instructions that enable actions, including:
displaying the one or more modified web documents in the browser; and
displaying the plugin document in the browser.

9. The system of claim 8, further comprising:
determining new contact information for a new entity in the one or more web documents that is unavailable in the remotely located datastore; and
modifying the one or more web documents to indicate the new contact information for the new entity.

10. The system of claim 8, wherein determining the business information further comprises:
providing a portion of the content-of-interest to one or more external information services, wherein the one or more external information services provides additional other information; and
providing the additional other information to the remotely located datastore for use in determining the business information.

11. The system of claim 8, wherein determining the business information further comprises:
determining feedback information from the one or more users, wherein the feedback information is related to one or more of the determined business information or the content of interest; and
providing the feedback information to the remotely located datastore for use as other information in subsequently determining new business information.

12. The system of claim 8, further comprising:
configuring the browser plugin for use in a particular geographic region;
providing a warning in the plugin document when a portion of the contact information for the entity is determined to be outside the particular geographic region and an amount of the outside portion of the contact information is greater than a threshold; and
modifying the one or more web documents by adding contact information for the entity that is inside the particular geographic region.

13. The system of claim 8, wherein the one or more users is enabled to employ the browser to perform one or more actions, further comprising:
monitoring one or more behaviors of the one or more users with the plug-in; and
blocking each performed action that is determined to be unrelated to the determined business information or notifying the one or more users of each performed action that is determined to be unrelated to the determined business information.

14. The system of claim 8, further comprising, determining contact access information based on the content-of-interest and the one or more web documents, wherein the determined contact access information includes an identifier corresponding to one or more other actions that were performed on the content-of-interest by another user.

15. A processor readable non-transitive storage media that includes instructions for displaying information in a browser over a network, wherein a network device that executes at least a portion of the instructions enables actions, comprising:
determining content-of-interest that is included in one or more web documents based in part on a content profile, wherein the content profile corresponds to a source of the one or more web documents and the content-of-interest includes at least contact information for an entity, and wherein the one or more web documents is viewed by one or more users employing a plug-in for the browser;

determining business information associated with the content-of-interest based on other information remotely located in a datastore, wherein the business information includes new contact information for customers and non-customers of a business;

determining a performance value for the one or more users based the at least one user's percentage of converting non-customers into customers of the business;

when the performance value for the one or more users exceeds a defined threshold, generating plugin information that is included in a plugin document based on the determined business information and the content-of-interest, wherein the plugin document is provided to the one or more users employing the plug-in for the browser;

when the performance value for the one or more users is less than the defined threshold, excluding a highest quality portion of the business information from the plugin document that is provided to the one or more users;

modifying the one or more web documents based on the determined business information and the content-of-interest, wherein at one or more portions of the one or more modified web documents corresponds to the content-of-interest, and wherein the modifying includes one or more of graying out the one or more portions of the one or more web documents, adding content to the one or more portions of the one or more web documents, changing one or more colors of the one or more portions of the one or more web documents, changing one or more styles of the one or more portions of the one or more web documents, or changing one or more formats of the one or more portions of the one or more web documents;

providing the one or more modified web documents and the plugin document for display in the browser, wherein the one user is enabled to perform at least one action related to the determined business information; and when a plurality of users access a same modified web document within a given period of time, providing one or more notifications to the plurality of users advising that the same modified web document is over prospected by the plurality of users and one or more other modified web documents are under prospected based on a determined number of the plurality of users accessing the same modified web document.

16. The media of claim 15, further comprising:
determining new contact information for a new entity in the one or more web documents that is unavailable in the remotely located datastore; and
modifying the one or more web documents to indicate the new contact information for the new entity.

17. The media of claim 15, wherein determining the business information further comprises:
providing a portion of the content-of-interest to one or more external information services, wherein the one or more external information services provides additional other information; and
providing the additional other information to the remotely located datastore for use in determining the business information.

18. The media of claim 15, wherein determining the business information further comprises:
determining feedback information from the one or more users, wherein the feedback information is related to one or more of the determined business information or the content of interest; and
providing the feedback information to the remotely located datastore for use as other information in subsequently determining new business information.

19. The media of claim 15, further comprising:
configuring the browser plugin for use in a particular geographic region;
providing a warning in the plugin document when a portion of the contact information for the entity is determined to be outside the particular geographic region and an amount of the outside portion of the contact information is greater than a threshold; and
modifying the one or more web documents by adding contact information for the entity that is inside the particular geographic region.

20. The media of claim 15, further comprising, determining contact access information based on the content-of-interest and the one or more web documents, wherein the determined contact access information includes an identifier corresponding to one or more other actions that were performed on the content-of-interest by another user.

21. A network device for displaying information in a browser over a network, comprising:
a transceiver for communicating over the network;
a memory for storing instructions;
one or more processor devices that is operative to execute instructions that enable actions, including:
determining content-of-interest that is included in one or more web documents based in part on a content profile, wherein the content profile corresponds to a source of the one or more web documents and the content-of-interest includes contact information for an entity, and wherein the one or more web documents is viewed by one or more users employing a plug-in for the browser;
determining business information associated with the content-of-interest based on other information remotely located in a datastore, wherein the business information includes new contact information for customers and non-customers of a business;
determining a performance value for the one or more users based the one user's percentage of converting non-customers into customers of the business;
when the performance value for the one or more users exceeds a defined threshold, generating plugin information that is included in a plugin document based on the determined business information and the content-of-interest, wherein the plugin document is provided to the one or more users employing the plug-in for the browser;
when the performance value for the one or more users is less than the defined threshold, excluding a highest quality portion of the business information from the plugin document that is provided to the one or more users;
modifying the one or more web documents based on the determined business information and the content-of interest, wherein at one or more portions of the one or more modified web documents corresponds to the content-of-interest, and wherein the modifying includes one or more of graying out the one or more portions of the one or more web documents, adding content to the one or more portions of the one or more web documents, changing one or more colors of the one or more portions of the one or more web documents, changing one or more styles of the one or more portions of the one or more web documents, or changing one or more formats of the one or more portions of the one or more web documents;
providing the one or more modified web documents and the plugin document for display in the browser, wherein the one user is enabled to perform one action related to the determined business information; and
when a plurality of users access a same modified web document within a given period of time, providing one or more notifications to the plurality of users advising that the same modified web document is over prospected by the plurality of users and one or more other modified web documents are under prospected based on a determined number of the plurality of users accessing the same modified web document.

22. The network device of claim 21, further comprising:
determining new contact information for a new entity in the one or more web documents that is unavailable in the remotely located datastore; and
modifying the one or more web documents to indicate the new contact information for the new entity.

23. The network device of claim 21, wherein determining the business information further comprises:
   providing a portion of the content-of-interest to one or more external information services, wherein the one or more external information services provides additional other information; and
   providing the additional other information to the remotely located datastore for use in determining the business information.

24. The network device of claim 21, wherein determining the business information further comprises:
   determining feedback information from the one or more users, wherein the feedback information is related to one or more of the determined business information or the content of interest; and
   providing the feedback information to the remotely located datastore for use as other information in subsequently determining new business information.

25. The network device of claim 21, further comprising:
   configuring the browser plugin for use in a particular geographic region;
   providing a warning in the plugin document when a portion of the contact information for the entity is determined to be outside the particular geographic region and an amount of the outside portion of the contact information is greater than a threshold; and
   modifying the one or more web documents by adding contact information for the entity that is inside the particular geographic region.

26. The network device of claim 21, wherein the one or more users is enabled to employ the browser to perform one or more actions, further comprising:
   monitoring one or more behaviors of the one or more users with the plug-in; and
   blocking each performed action that is determined to be unrelated to the determined business information or notifying the one or more users of each performed action that is determined to be unrelated to the determined business information.

* * * * *